(12) United States Patent
Peng et al.

(10) Patent No.: US 7,924,555 B2
(45) Date of Patent: Apr. 12, 2011

(54) PORTABLE ELECTRONIC DEVICE

(75) Inventors: Tien-Haw Peng, Hsinchu (TW);
Cheng-Hao Lee, Hsinchu (TW);
Kai-Chang Chuang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 30 days.

(21) Appl. No.: 12/556,557

(22) Filed: Sep. 9, 2009

(65) Prior Publication Data

US 2011/0002097 A1    Jan. 6, 2011

(30) Foreign Application Priority Data

Jul. 2, 2009   (TW) .............................. 98122436 A

(51) Int. Cl.
*H05K 5/00* (2006.01)
*H05K 7/00* (2006.01)
(52) U.S. Cl. .......... 361/679.26; 361/679.04; 361/679.21
(58) Field of Classification Search ............. 361/679.04, 361/679.21, 679.26
See application file for complete search history.

(56) References Cited

U.S. PATENT DOCUMENTS

| 2003/0095373 A1* | 5/2003 | Duquette | 361/681 |
| 2004/0136150 A1* | 7/2004 | Ho | 361/681 |
| 2006/0187143 A1* | 8/2006 | Cho et al. | 345/1.1 |

* cited by examiner

*Primary Examiner* — Lisa Lea-Edmonds
*Assistant Examiner* — Anthony M Haughton
(74) *Attorney, Agent, or Firm* — Chun-Ming Shih

(57) ABSTRACT

A portable electronic device includes a shell, a control circuit, a display panel and at least a bi-stability display module. The shell has an opening and an accommodating cavity in two different surfaces. The control circuit includes a first information transmission unit. The control circuit and the display panel are disposed in the shell. The display panel is electrically connected to the control circuit. The display panel has a display surface exposed from the opening. The bi-stability display module is detachably disposed in the accommodating cavity and selectively electrically connected to the control circuit. The bi-stability display module includes a second information transmission unit for communicating with the first information transmission unit and a bi-stability display for displaying the information received by the second information transmission unit. The bi-stability display module can display when the control circuit is closed. The power-consumption of the portable electronic device may be decreased.

13 Claims, 6 Drawing Sheets

PORTABLE ELECTRONIC DEVICE

This application claims priority to a Taiwan application No. 098122436 filed Jul. 2, 2009.

BACKGROUND

1. Field of the Invention

The present invention relates to a portable electronic device, and particularly to a portable electronic device having a detachable bi-stability display.

2. Description of the Related Art

With the development of the information transmission and the evolvement of the electronic products, the response speed, the resolution and the image quality of displays are improved gradually. It is more expected that the function or the display mode of the displays can be developed innovatively. In recent years, dual displays are widely applied to various portable electronic devices, for example, a mobile telephone, a personal digital assistant (PDA) and a notebook computer, and so on.

For example, nowadays, a notebook computer having dual displays has been sold in the market. The dual displays facilitate increasing convenience of using the notebook computer. The notebook computer has a front plate. The front plate has a surface back to a main display. A small sub-display and a control module for controlling the small sub-display are disposed on the surface of the front plate. Thus, when the notebook computer is in a shut-down state, the user still can read email, listen to music and watch movie through the sub-display.

However, all electric power needed by the main display and the sub-display is supplied by a host of the notebook computer. Moreover, the sub-display can not be detached from the notebook computer. Thus, when only the sub-display is used, the whole notebook computer must be carried, thereby causing inconvenience for the user.

Therefore, what is needed is a portable electronic device having a detachable bi-stability display to overcome the disadvantages of the electronic device having dual displays described above.

BRIEF SUMMARY

The present invention is directed to a portable electronic device having a bi-stability display module. The bi-stability display module is capable of being detached from the portable electronic device and being connected to the portable electronic device via various connecting structures. The portable electronic device having a bi-stability display module can be used conveniently.

The present invention provides a portable electronic device. The portable electronic device includes a shell, a control circuit, a display panel and at least a bi-stability display module. The shell has an opening and an accommodating cavity. The opening and the accommodating cavity are defined in two different surfaces of the shell. The control circuit includes a first information transmission unit. The control circuit and the display panel are disposed in the shell. The display panel is electrically connected to the control circuit. The display panel has a display surface exposed from the opening of the shell. The bi-stability display module is detachably disposed in the accommodating cavity of the shell and selectively electrically connected to the control circuit. The bi-stability display module includes a second information transmission unit and a bi-stability display. The second information transmission unit is configured for communicating with the first information transmission unit. The bi-stability display is configured for displaying the information received by the second information transmission unit.

In one embodiment provided by the present invention, the shell includes a lower shell and an upper shell. The lower shell has a first surface. The upper shell has a second surface and a third surface on an opposite side of the upper shell to the second surface. The opening is defined in the second surface. The accommodating cavity is defined in the third surface. The upper shell is pivoted to the lower shell so as to be rotated relative to the lower shell and be close to the lower shell. The second surface faces to the first surface and is located between the first surface and the third surface when the upper shell is close to the lower shell.

In one embodiment provided by the present invention, the shell includes a lower shell and an upper shell. The lower shell has a first surface. The upper shell has a second surface. The accommodating cavity is defined in the first surface. The opening is defined in the second surface. The upper shell is pivoted to the lower shell so as to be rotated relative to the lower shell and be closed to on the lower shell. The second surface faces to the first surface and is located on the first surface when the upper shell is closed to on the lower shell.

In one embodiment provided by the present invention, the bi-stability display module further includes a storing unit for storing the information received by the second information transmission unit.

In one embodiment provided by the present invention, the first information transmission unit and the second information transmission unit are a wire transmission unit respectively.

In one embodiment provided by the present invention, the first information transmission unit and the second information transmission unit are a wireless transmission unit respectively.

In one embodiment provided by the present invention, the control circuit includes a power supplying unit. The power supplying unit is configured for supplying electric power to the bi-stability display module when the bi-stability display module is electrically connected to the control circuit.

In one embodiment provided by the present invention, the portable electronic device includes a clamping component connected to the shell. The clamping component has an inserting slot.

In one embodiment provided by the present invention, the shell includes a receiving groove. An end of the clamping component is pivoted to the shell and located in the receiving groove so that the clamping component is configured for being rotated relative to the receiving groove.

In one embodiment provided by the present invention, the shell includes a receiving groove. The clamping component is configured for being slid out of or into the receiving groove relative to the shell along an extending direction of the receiving groove.

In one embodiment provided by the present invention, the portable electronic device further includes a supporting component disposed in the accommodating cavity and between the shell and the bi-stability display module. The supporting component is configured for moving relative to the shell so as to raise a part of the bi-stability display module, thereby forming an angle between the bi-stability display module and the shell.

In one embodiment provided by the present invention, the bi-stability display is an electrophoretic display.

In one embodiment provided by the present invention, the portable electronic device is selected from a group consisting of a notebook computer, a mobile telephone, and a personal digital assistant.

The portable electronic device has a bi-stability display module detachably disposed in the accommodating cavity of the shell, which is capable of transmitting information with the control circuit each other. Therefore, the convenience of using the portable electronic device can be improved, the source of the electric power supplying to the bi-stability display module can be increased and the bi-stability display module also can serve as an expanding storing memory of the portable electronic device.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The portable electronic device, for example, but not limited to, a notebook computer is described as follow. It is noted that the portable electronic device can also be a mobile telephone, a personal digital assistant (PDA) or other portable electronic devices.

Figure 1A:
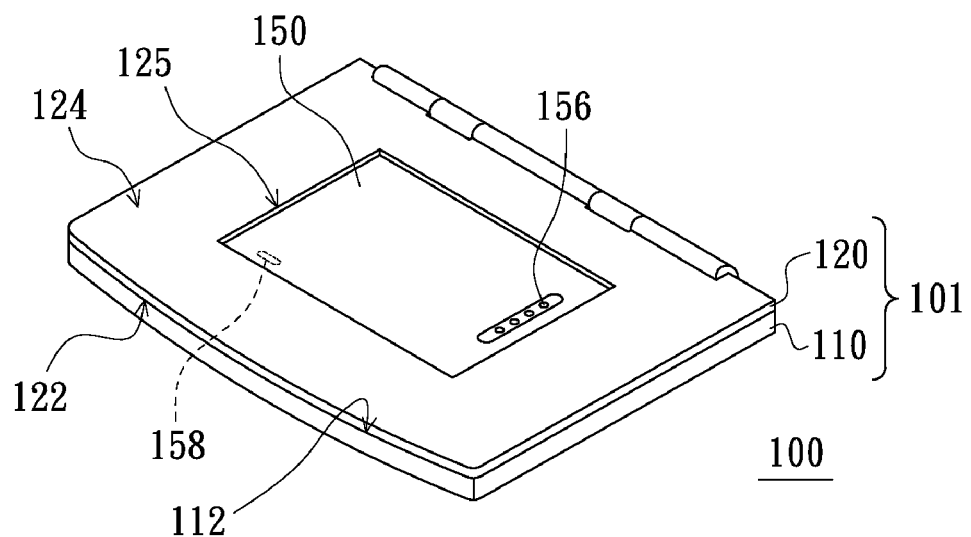
FIG. 1A is an isometric view of a portable electronic device in accordance with an embodiment of the present invention, which is in a close state.
Figure 1B:
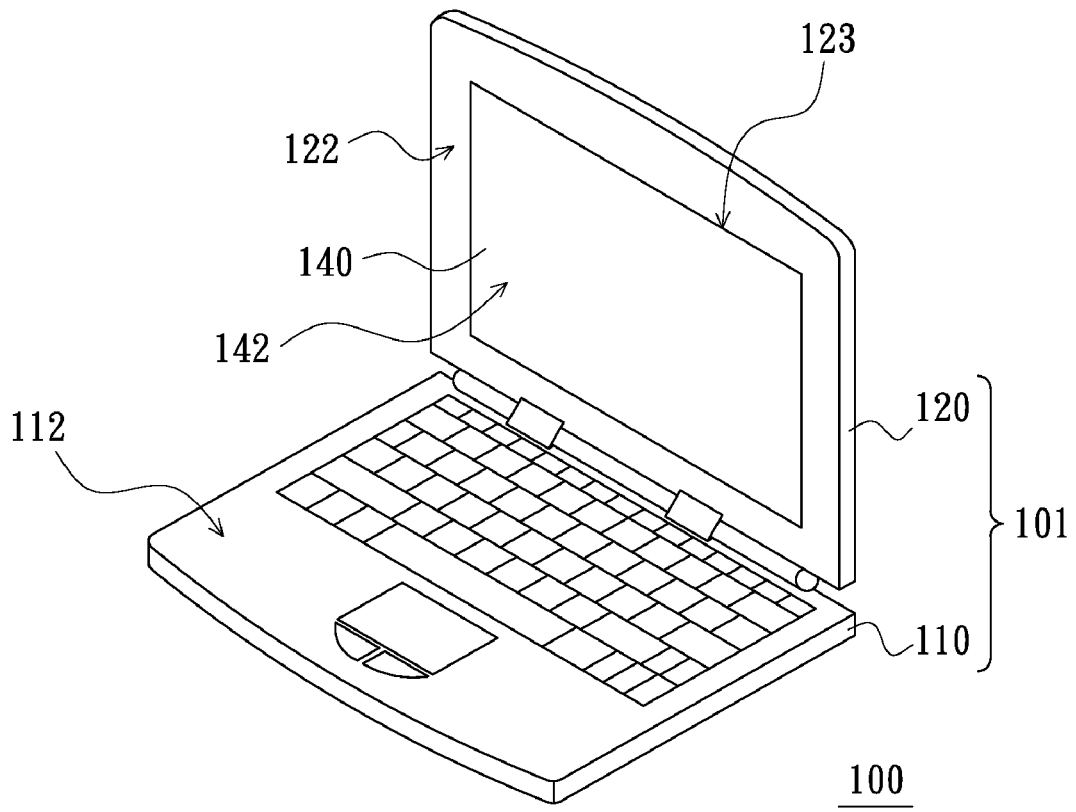
FIG. 1B is an isometric view of the portable electronic device shown in FIG. 1A, which is in an open state.
Figure 2:
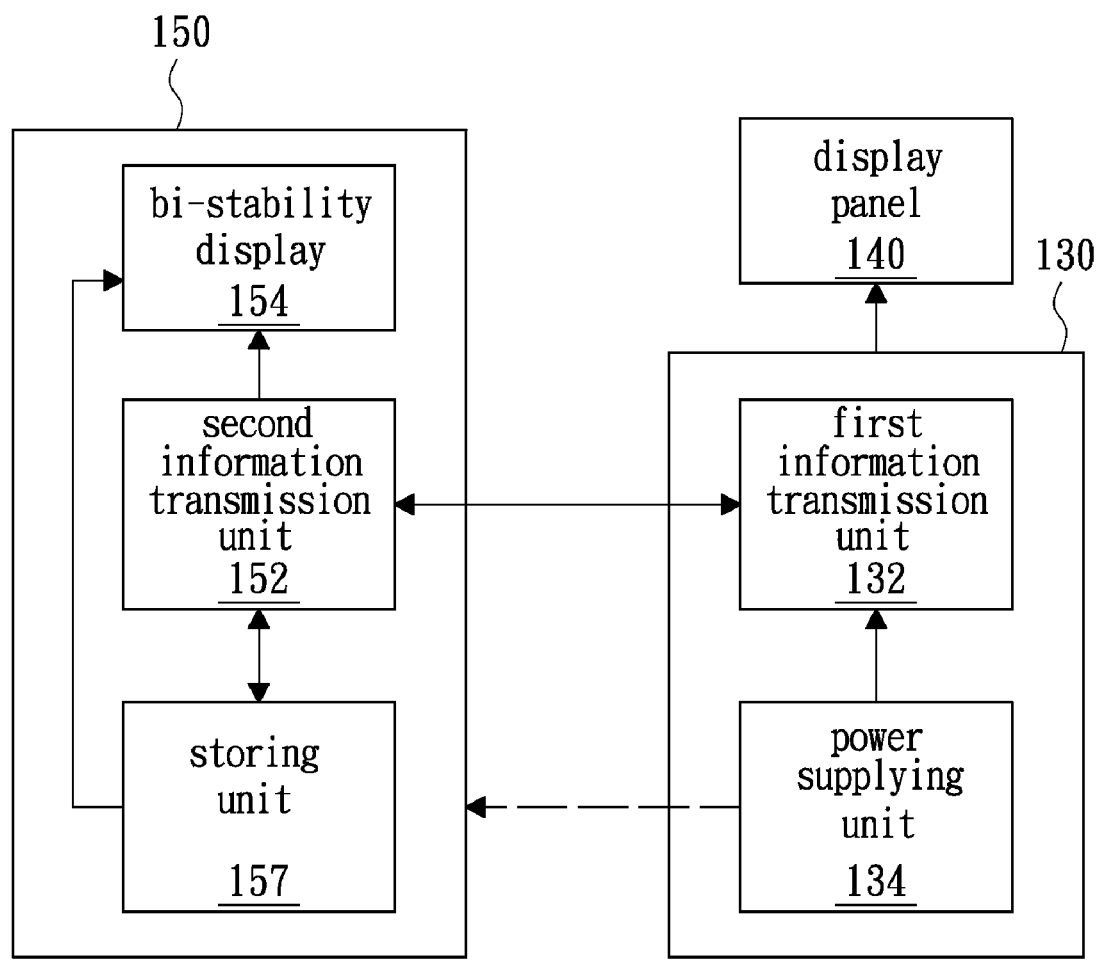
FIG. 2 is a circuit block diagram of the portable electronic device shown in FIG. 1A.

FIG. 1A is an isometric view of a portable electronic device in accordance with an embodiment of the present invention, which is in a close state. FIG. 1B is an isometric view of the portable electronic device shown in FIG. 1A, which is in an open state. FIG. 2 is a circuit block diagram of the portable electronic device shown in FIG. 1A. Referring to FIG. 1A, FIG. 1B and FIG. 2, in the present embodiment, the portable electronic device 100 includes a shell 101, a control circuit 130, a display panel 140 and a bi-stability display module 150. The shell 101 includes a lower shell 110 and an upper shell 120. The lower shell 110 has a first surface 112. The upper shell 120 has a second surface 122 and a third surface 124 on an opposite side of the upper shell 120. The upper shell 120 has an opening 123 defined on the second surface 122 and an accommodating cavity 125 defined in the third surface 124. That is, the opening 123 and the accommodating cavity 125 are defined in two different surfaces of the shell 101. The upper shell 120 is pivoted to the lower shell 110 so that the upper shell 120 can be rotated relative to the lower shell 110. Thus, the shell 101 can be either in a close state or in an open state. When the upper shell 120 is closed to the lower shell 110 (i.e., the shell 101 is in a close state), the second surface 122 faces to the first surface 112 and is located between the first surface 112 and the third surface 124, as shown in FIG. 1A.

The control circuit 130 is disposed in the lower shell 110. The control circuit 130 includes a first information transmission unit 132. The display panel 140 is disposed in the upper shell 120 and electrically connected to the control circuit 130. The display panel 140 has a display surface 142. The display surface 142 is exposed from the opening 123 of the upper shell 120 so that a user can watch images displayed by the display panel 140 through the display surface 142. The display panel 140 can be a liquid crystal display (LCD) panel, an organic electro-luminescence display (OELD) panel or other thin display panels.

In detail, the portable electronic device 100 is a foldable electronic device. In the present embodiment, the control circuit 130 in the lower shell 110 includes a computer host and an input device (e.g., a keyboard or a mouse). The display panel 140 is a main component in the upper shell 120. It is noted that other electronic components, for example, but not limited to, a webcam (not shown), also can be disposed in the upper shell 120.

The bi-stability display module 150 is detachably disposed in the accommodating cavity 125 of the upper shell 120 and selectively electrically connected to the control circuit 130. The bi-stability display module 150 can be removed from the accommodating cavity 125 and detached from the portable electronic device 100. The bi-stability display module 150 can be electrically connected to the control circuit 130 or electrically unconnected to the control circuit 130. It is noted that the number of the bi-stability display module 150 is not limited by the present embodiment. The number of the bi-stability display module 150 can be determined according to the demand of the different portable electronic devices. It is also noted that the number of the accommodating cavity 125 in the third surface 124 of the upper shell 120 should correspond to the number of the bi-stability display module 150.

The bi-stability display module 150 includes a second information transmission unit 152 and a bi-stability display 154. The second information transmission unit 152 is configured for communicating with the first information transmission unit 132. That is, the second information transmission unit can received the information from the first information transmission unit 132 and also can send the information to the first information transmission unit 132. The bi-stability display 154 is configured for displaying the information received by the second information transmission unit 152. In the present embodiment, the bi-stability display 154 is an electrophoretic display (EPD).

In the present embodiment, the bi-stability display module 150 can be, for example, an electric paper operating separately. The bi-stability display module 150 can further includes a thin film touch button 156 and a thin film battery 158. The thin film touch button 156 is disposed in the bi-stability display 154. The user can operate the bi-stability display module 150 by touching the thin film button 156.

Referring to FIG. 2 again, the control circuit 130 further includes a power supplying unit 134. In the present embodiment, the power supplying unit 134 is, for example, a battery for a notebook computer. It is noted that the bi-stability display module 150 electrically connected to the control circuit 130 can also be supplied with a driving electric power by the power supplying unit 134.

In detail, the bi-stability display module 150 can be electrically connected to the control circuit 130 via a wire. A transmission interface between the first information transmission unit 132 and the second information transmission unit 152 is, for example, a universal series bus (USB) interface. Further, the bi-stability display module 150 can electrically connected to the control circuit 130 via an additional USB transmission wire (not shown) or directly electrically plugged into the control circuit 130. Thus, the first information transmission unit 132 and the second information transmission unit 152 are a wire transmission unit respectively. Additionally, the first information transmission unit 132 and the second information transmission unit 152 communicate with each other through a wireless transmission fashion. The wireless transmission fashion can be a bluetooth transmission, an infrared transmission, a wireless fidelity (WiFi) transmission, a worldwide interoperability for microwave access (WiMax) transmission, and so on. Thus, the first information transmission unit 132 and the second information transmission unit 152 are a wireless transmission unit respectively.

Particularly, in FIG. 2, in the present embodiment, the bi-stability display module 150 further includes a storing unit 157 configured for storing the information received by the second information transmission unit 152 from the first information transmission unit 132. In other words, after the information received by the second information transmission unit 152 is stored in the storing unit 157, the bi-stability display 154 can display images according to the information stored in the storing unit 157. Even if the control circuit 130 was close or the bi-stability display module 150 was pulled out from the control circuit 130 and electrically unconnected to the control circuit 130, the bi-stability display 154 still could display images according to the information stored in the storing unit 157. In addition, the portable electronic device 100 can transmit the information stored originally in the storing unit 157 to the control circuit 130 through the second information transmission unit 152. That is, the storing unit 157 of the bi-stability display module 150 can serve as an expanding storing memory of the control circuit 130.

As described above, the bi-stability display module 150 can be electrically connected to the control circuit 130 via a wire connecting structure or a wireless connecting structure so that the bi-stability display module 150 and the control circuit 130 communicate with each other. Additionally, the bi-stability display module 150 can be used independently. In the present embodiment, when the computer host of the control circuit 130 is shot-down, the user still can read electronic files, for example, emails, by use of the bi-stability display 154.

Figure 3:
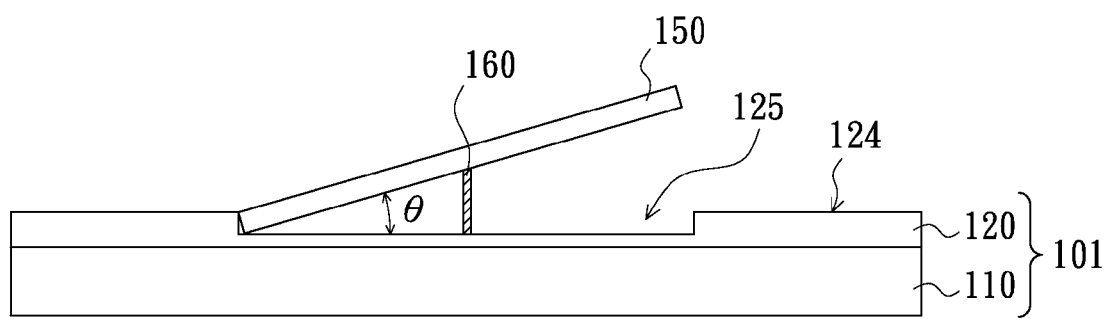
FIG. 3 is a side view of a portable electronic device in accordance with another embodiment of the present invention, which is in a close state.

FIG. 3 is a side view of a portable electronic device in accordance with another embodiment of the present invention, which is in a close state. Referring to FIG. 3, the portable electronic device 100 further includes a supporting component 160. Thus, when the user read the electronic files by use of the bi-stability display module 150, an angle of the bi-stability display module 150 and the upper shell 120 can be adjusted according to the angle of view of the user. The supporting component 160 is disposed in the accommodating cavity 125 and between the upper shell 120 and the bi-stability display module 150. The supporting component 160 is configured for moving relative to the upper shell 120 to raise a part of the bi-stability display module 150. Thus, an angle θ is formed between the bi-stability display module 150 and the upper shell 120.

In detail, the supporting component 160 can be either a supporting plate pivoted to the upper shell 120 or a supporting plate pivoted to the bi-stability display module 150. The supporting component 160 can be rotated relative to the upper shell 120 and the bi-stability display module 150, thereby supporting between the upper shell 120 and the bi-stability display module 150 and forming the angle θ between the bi-stability display module 150 and the upper shell 120. It is noted that the supporting component 160 can be disposed between the upper shell 120 and the bi-stability display module 150 in other suitable manners so that the angle θ between the bi-stability display module 150 and the upper shell 120 can be adjusted.

Figure 4:
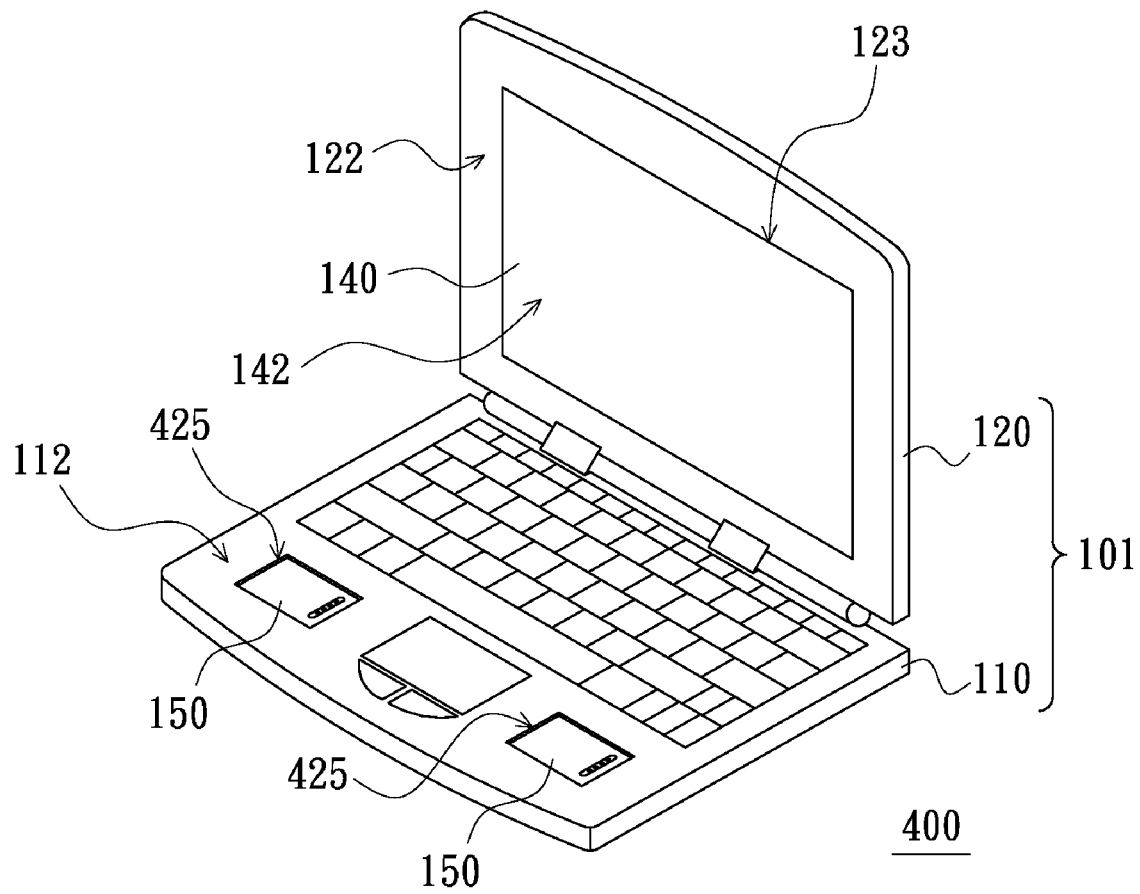
FIG. 4 is an isometric view of a portable electronic device in accordance with further another embodiment of the present invention, which is in an open state.

In the aforementioned embodiments, the accommodating cavity 125 for accommodating the bi-stability display module 150 is defined, but not limited to, in the third surface 124 of the upper shell 120. FIG. 4 is an isometric view of a portable electronic device in accordance with further another embodiment of the present invention, which is in an open state. Referring to FIG. 4, in the present embodiment, the accommodating cavity 425 of the shell 101 is defined in the first surface 112 of the lower shell 110. In detail, the accommodating cavity 425 is located at a side of the input device (e.g., a keyboard or a mouse). In the present embodiment, the lower shell 110 has two accommodating cavities 425 for accommodating two bi-stability display modules 150. It is noted that the number of the bi-stability display module 150 is not limited by the present embodiment. In addition, when the upper shell 120 is closed to on the lower shell 110 (i.e., the portable electronic device 400 is in a close state), the second surface 122 of the upper shell 120 faces to the first surface 112 of the lower shell 110 and is located on the first surface 112.

Additionally, the portable electronic device 400 can further includes the supporting component 160 shown in FIG. 3. Thus, when the user read the electronic files by use of the bi-stability display module 150, an angle of the bi-stability display module 150 and the lower shell 110 can be adjusted according to the angle of view of the user. The supporting component 160 of the portable electronic device 400 is similar to or identical to the supporting component 160 in the aforementioned embodiments. The structure and the operation of the supporting component 160 of the portable electronic device 400 can refer to the aforementioned embodiments and are not described here.

In the aforementioned embodiments, the bi-stability display module 150 all are disposed in the accommodating cavity 125 of the upper shell 120 or the accommodating cavity 425 of the lower shell 110. It is noted that the bi-stability display module 150 can indirectly be installed with the lower shell 110 or the upper shell 120.

Figure 5:
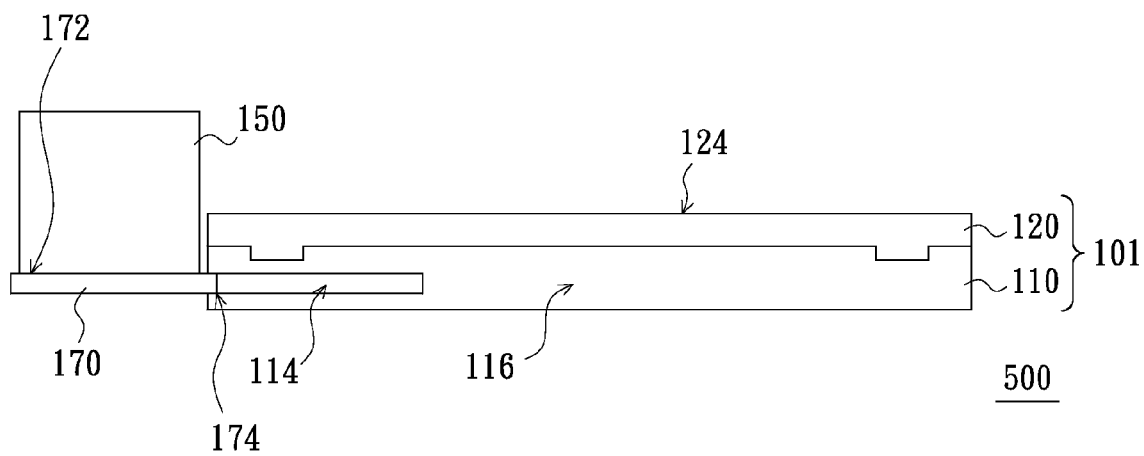
FIG. 5 is a rear view of a portable electronic device in accordance with still another embodiment of the present invention, which is in a close state.

FIG. 5 is an isometric view of a portable electronic device in accordance with still another embodiment of the present invention, which is in a close state. Referring to FIG. 5, the portable electronic device 500 is similar to the portable electronic device 100 except that the portable electronic device 500 includes a clamping component 170 connected to the lower shell 110. The clamping component 170 has an inserting slot 172. The inserting slot 172 is configured for inserting the bi-stability display module 150 therein, thereby fixing the bi-stability display module 150 on the clamping component 170. It is noted that the clamping component 170 can be configured for clamping other objects, for example, the paper documents.

The lower shell 110 further includes a receiving groove 114. In the present embodiment, the receiving groove 114 is defined in a side surface 116 adjacent to the first surface 112. The receiving groove 114 can also be defined in other surfaces and not limited by the present embodiment. In the present embodiment, an end 174 of the clamping component 170 is pivoted to the lower shell 110 and in the receiving groove 114. Thus, the clamping component 170 can be rotated relative to the receiving groove 114. Referring to FIG. 5, the clamping component 170 can be rotated around the end 174 and out of the receiving groove 114. Thus, the clamping component 170 can be used to clamp the bi-stability display module 150. On the contrary, the clamping component 170 can be rotated around the end 174 and into the receiving groove 114. Thus, the clamping component 170 can be received and hidden in the receiving groove 114, thereby decreasing the volume of the portable electronic device 500.

Figure 6:
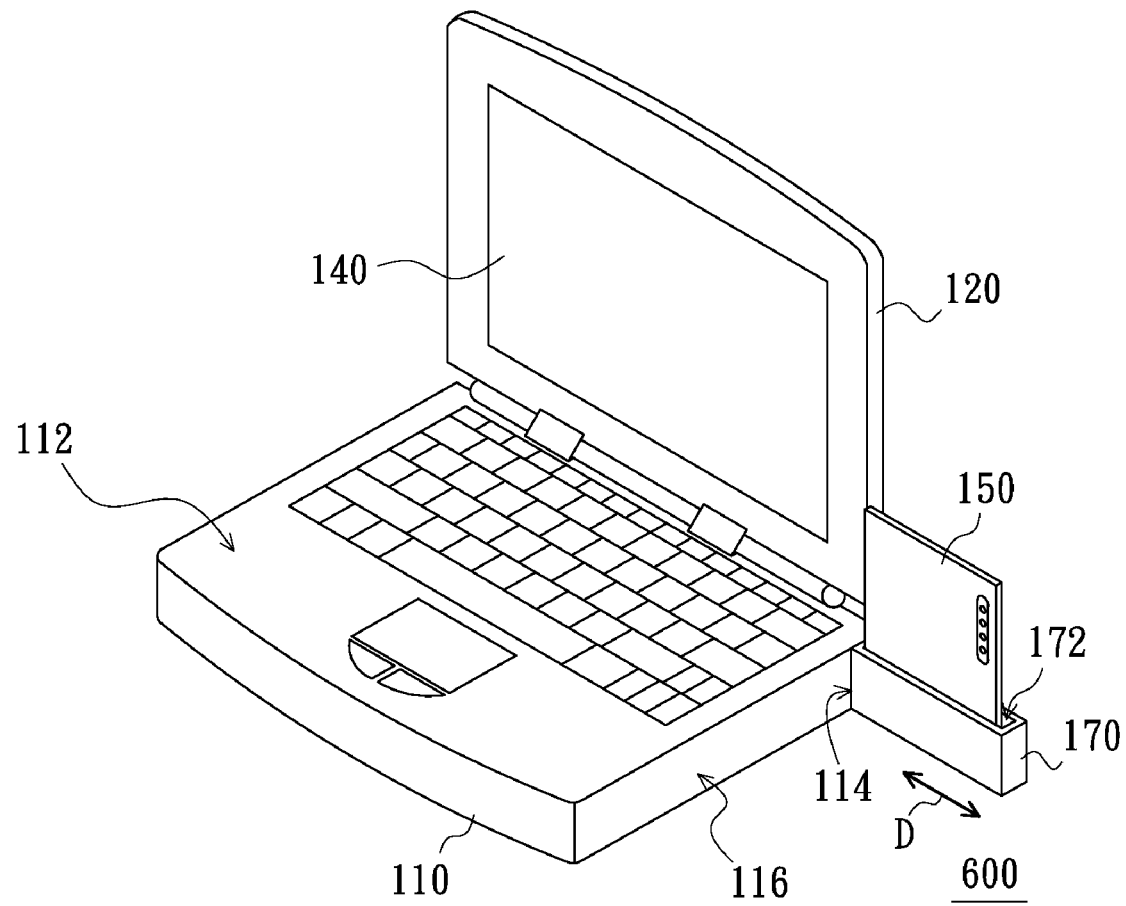
FIG. 6 is an isometric view of a portable electronic device in accordance with yet another embodiment of the present invention, which is in an open state.

Additionally, referring to FIG. 6, in yet another embodiment of the present invention, the clamping component 170 can be slid relative to the lower shell 110 along the extending direction D of the receiving groove 114. In detail, the clamping component 170 can be slid out of the receiving groove 114 along the extending direction D of the receiving groove 114. Thus, the clamping component 170 can be used to clamp the bi-stability display module 150. On the contrary, the clamping component 170 can be slid into the receiving groove 114 along the extending direction D of the receiving groove 114. Thus, the clamping component 170 can be received and hidden in the receiving groove 114, thereby decreasing the volume of the portable electronic device 600. The clamping component 170 can be slid in the receiving groove 114 by cooperation of the sliding guide and sliding block or other suitable structures. It is well known to one skilled in the art and not described here.

The portable electronic device has a bi-stability display module capable of transmitting information with the control circuit each other. The bi-stability display module has a low power-consumption. Therefore, even if the bi-stability display module was in a working state for a long time, the electric power supplied to the control circuit could not be consumed. Moreover, the bi-stability display module can has an independent power supply. Thus, even if the control circuit was close, the bi-stability display module still could display an image.

Additionally, the portable electronic device has a bi-stability display module detachably disposed in the accommodating cavity in the surface of the shell. When the upper shell is closed to on the lower shell, the user can watch images by use of the bi-stability display module. Moreover, the bi-stability display module can be removed from the accommodating cavity and detached from the portable electronic device. Therefore, the convenience of the portable electronic device can be improved greatly.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A portable electronic device, comprising:
    a shell having an opening and at least an accommodating cavity, wherein the opening and the at least an accommodating cavity are defined in different surfaces of the shell;
    a display panel disposed in the shell, the display panel having a display surface exposed from the opening;
    a control circuit unit disposed in the shell and electrically connected to the display panel, the control circuit comprising a first information transmission unit; and
    at least a bi-stability display module detachably disposed in the at least an accommodating cavity and selectively electrically connected to the control circuit, the bi-stability display module comprising:
        a second information transmission unit configured for communicating with the first information transmission unit; and
        a bi-stability display configured for displaying information received by the second information transmission unit.

2. The portable electronic device as claimed in claim 1, wherein the shell comprises:
    a lower shell having a first surface; and
    an upper shell having a second surface and a third surface opposite to the second surface, the opening being defined in the second surface, the at least a accommodating cavity being defined in the third surface, the upper shell being pivoted to the lower shell so as to be rotated relative to the lower shell and be closed to on the lower shell, and the second surface facing to the first surface and being located between the first surface and the third surface when the upper shell is closed to the lower shell.

3. The portable electronic device as claimed in claim 1, wherein the shell comprises:
    a lower shell having a first surface, the at least an accommodating cavity being defined in the first surface; and
    an upper shell having a second surface, the opening being defined in the second surface, the upper shell being pivoted to the lower shell so as to be rotated relative to the lower shell and be close to the lower shell, and the second surface facing to the first surface and being located on the first surface when the upper shell is closed to on the lower shell.

4. The portable electronic device as claimed in claim 1, wherein the bi-stability display module further comprises a storing unit for storing the information received by the first information transmission unit.

5. The portable electronic device as claimed in claim 1, wherein the first information transmission unit and the second information transmission unit are a wire transmission unit respectively.

6. The portable electronic device as claimed in claim 1, wherein the first information transmission unit and the second information transmission unit are a wireless transmission unit respectively.

7. The portable electronic device as claimed in claim 1, wherein the control circuit comprises a power supplying unit, and the power supplying unit is configured for supplying electric power to the bi-stability display module when the bi-stability display module is electrically connected to the control circuit.

8. The portable electronic device as claimed in claim 1, further comprising a clamping component connected to the shell, and the clamping component having an inserting slot.

9. The portable electronic device as claimed in claim 8, wherein the shell comprises a receiving groove, and an end of the clamping component is pivoted to the shell and located in the receiving groove so that the clamping component is configured for being rotated relative to the receiving groove.

10. The portable electronic device as claimed in claim 8, wherein the shell comprises a receiving groove, and the clamping component is configured for being slid out of or into the receiving groove relative to the shell along an extending direction of the receiving groove.

11. The portable electronic device as claimed in claim 1, further comprising a supporting component disposed in the accommodating cavity and between the bi-stability display module and the shell, the supporting component being configured for moving relative to the shell so as to raise a part of the bi-stability display module, thereby forming an angle between the bi-stability display module and the shell.

12. The portable electronic device as claimed in claim 1, wherein the bi-stability display is an electrophoretic display.

13. The portable electronic device as claimed in claim 1, wherein the portable electronic device is selected from a group consisting of a mobile telephone, a personal digital assistant, and a notebook computer.

* * * * *

UNITED STATES PATENT AND TRADEMARK OFFICE
CERTIFICATE OF CORRECTION

| | |
|---|---|
| PATENT NO. | : 7,924,555 B2 |
| APPLICATION NO. | : 12/556557 |
| DATED | : April 12, 2011 |
| INVENTOR(S) | : Peng et al. |

It is certified that error appears in the above-identified patent and that said Letters Patent is hereby corrected as shown below:

On the Title Page

Item (75) Inventors: Tien-Haw Peng, (Hsinchu, TW);
Cheng-Hao Lee, (Hsinchu, TW);
Kai-Chang Chuang, (Hsinchu, TW)

should be

Item (75) Inventors: Tien-Haw Peng, (Hsinchu, TW);
Cheng-Hao Lee, (Hsinchu, TW);
Kai-Cheng Chuang, (Hsinchu, TW)

The third inventor's name "Kai-Chang Chuang" is wrong and should be --Kai-Cheng Chuang--.

Signed and Sealed this
Fifteenth Day of May, 2012

David J. Kappos
*Director of the United States Patent and Trademark Office*